United States Patent [19]

Werner

[11] 4,196,931
[45] Apr. 8, 1980

[54] ADJUSTABLE HINGE FOR A BACKREST OF A VEHICLE SEAT

[75] Inventor: Paul Werner, Remscheid, Fed. Rep. of Germany

[73] Assignee: Keiper Automobiltechnik GmbH & Co. KG, Remscheid, Fed. Rep. of Germany

[21] Appl. No.: 927,522

[22] Filed: Jul. 24, 1978

[30] Foreign Application Priority Data

Jul. 30, 1977 [DE] Fed. Rep. of Germany ....... 2734565

[51] Int. Cl.² .......................................... A47C 1/025
[52] U.S. Cl. ..................................... 297/362; 16/143; 74/805
[58] Field of Search ............... 297/362, 361, 373, 374, 297/366, 367, 379, 354, 355; 16/139, 140, 143; 74/804, 805, 410

[56] References Cited

U.S. PATENT DOCUMENTS

| | | | |
|---|---|---|---|
| 3,232,136 | 2/1966 | Bahmuller | 297/366 X |
| 3,423,785 | 1/1969 | Pickles | 297/379 X |
| 3,432,881 | 3/1969 | Putsch et al. | 297/366 X |
| 3,534,636 | 10/1970 | Lorence | 74/805 |

FOREIGN PATENT DOCUMENTS

| | | | |
|---|---|---|---|
| 2028723 | 12/1971 | Fed. Rep. of Germany | 297/362 |
| 1091994 | 11/1967 | United Kingdom | 297/373 |
| 1170708 | 11/1969 | United Kingdom | 16/143 |

*Primary Examiner*—William E. Lyddane
*Attorney, Agent, or Firm*—Michael J. Striker

[57] ABSTRACT

A hinge for adjustably mounting a backrest component on a seat component of a vehicle seat includes two hinge members respectively connected to the components of the seat. One of the hinge members includes a hinge element and two spur gears which flank the hinge element, are mounted on an eccentric rotatably mounted on the other hinge member, and are connected to the hinge element for joint turning. The other hinge member includes two hinge portions which embrace the hinge element of the one hinge member and each of which has an internal gear annulus which meshes with one of the spur gears. The hinge portions of the other hinge member are turntable relative to one another for eliminating play between the teeth of the spur gears, on the one hand, and of the internal gear annuli, on the other hand. An elongated body of elastically yieldable material is connected, at its ends, to the hinge portions of the other hinge member and maintains the same in the respective play-eliminating position relative to one another.

11 Claims, 5 Drawing Figures

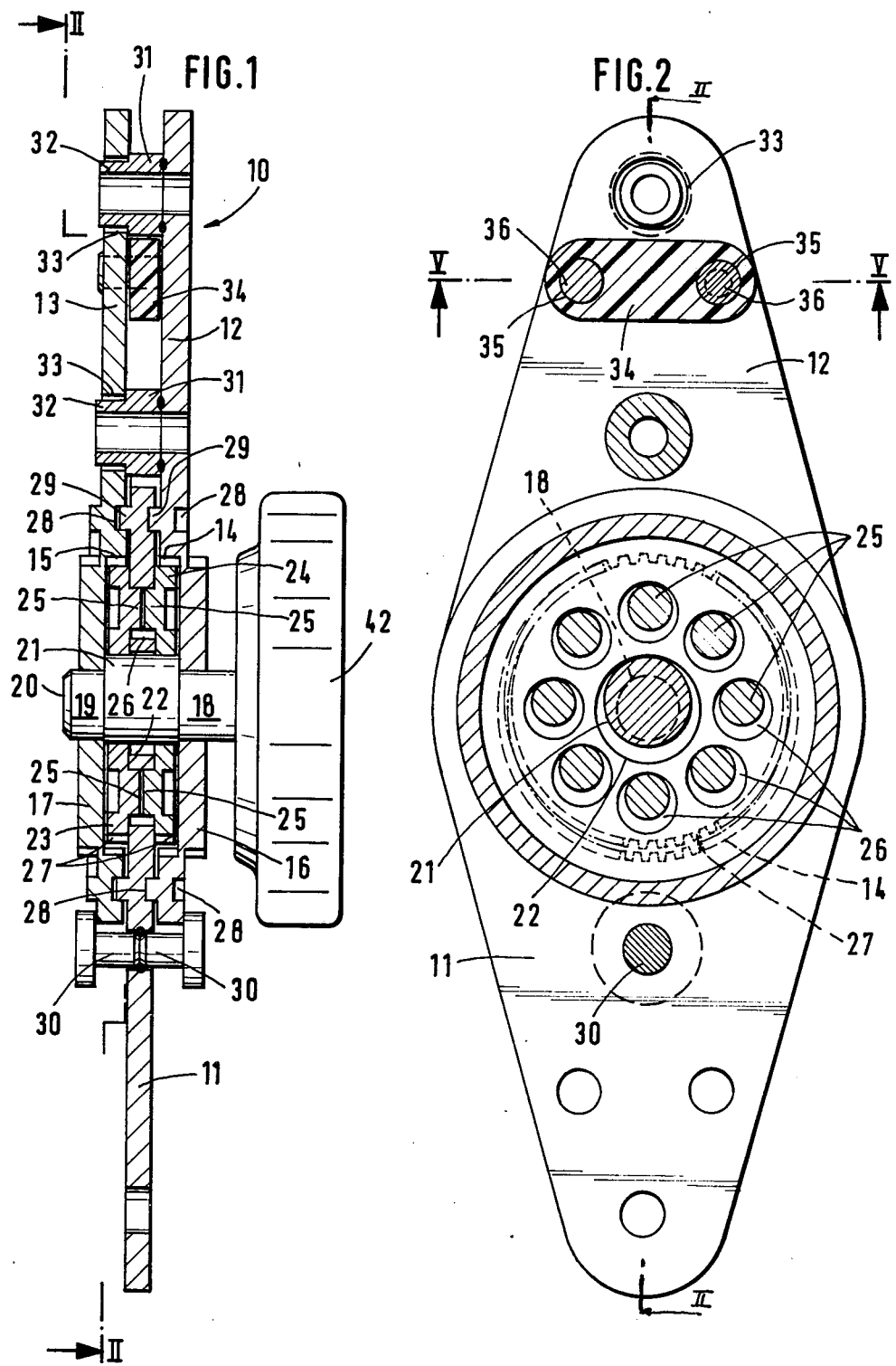

ADJUSTABLE HINGE FOR A BACKREST OF A VEHICLE SEAT

BACKGROUND OF THE INVENTION

The present invention relates to a hinge for adjustably mounting a backrest component on a seat component of a seat in general, and more particularly to a hinge arrangement of this type which is especially suited for use in a vehicle seat.

There are already known various hinge arrangements for adjustably mounting a backrest component on a seat component of a seat, such as of a vehicle seat, which, generally speaking, include at least one hinge having two hinge members each rigidly connected to one of the components of the seat. Then, it is also already known to interpose an adjusting and retaining mechanism between the hinge members, this mechanism including an internal gear annulus on one of the hinge members, an eccentric mounted on this one member for rotation about a pivot axis, and a spur gear which is turnably mounted on the eccentric, connected to the one hinge member for joint turning, and which has an external gear annulus which meshes with the internal gear annulus of the one hinge member during rotation of the eccentric as the spur gear orbits the pivot axis.

One conventional hinge arrangement of this type is known from German Pat. No. DT-PS 1,755,421, wherein the hinge member connected to the backrest component and the hinge member connected with the seat component are arranged along a common place. However, the hinge member connected with the backrest component, which embraces an eccentric section of the eccentric by a bearing disc and a holding disc, is supported in an assymmetrical position with respect to a spur gear which is connected with the other hinge member. As a result of this, there may be encountered positive forces at heavier loads which render the actuation more difficult. In addition thereto, it is impossible to eliminate the radial play which exists as a result of manufacturing tolerances of the teeth annuli and of the structural parts which are mounted on the different portions of the eccentric. This radial play is very disadvantageous in that it results, during the operation of the vehicle equipped with the seat having the hinge arrangement of this type, and with the seat being unoccupied, in unpleasant and distracting rattling noises.

SUMMARY OF THE INVENTION

Accordingly, it is a general object of the present invention to avoid the disadvantages of the prior art.

More particularly, it is an object of the present invention to provide a hinge for adjustably mounting a backrest component on a seat component of a vehicle seat, which is not possessed of the disadvantages of the conventional hinge arrangements of this type.

A further object of the present invention is to so construct the hinge arrangement of the type here under consideration as to be subjected only to symmetrical loading.

Yet another object of the invention is to so design the hinge arrangement as to be able to eliminate the radial play between the various parts thereof and thus to avoid the above-mentioned rattling noise.

A concomitant object of the present invention is to develop a hinge arrangement which is simple in construction, inexpensive to manufacture and assemble, and reliable in operation nevertheless.

In pursuance of these objects and others which will become apparent hereafter, one feature of the present invention resides in a hinge arrangement for adjustably mounting a backrest component on a seat component of a seat, particularly of a vehicle seat which, briefly stated, comprises, in combination, two hinge members each rigidly connected to one of the components of the seat and each having a pair of gear sections, each section of one of said pairs having an internal gear annulus, and each section of the other of said pairs having an external gear annulus; at an eccentric mounted on one of the hinge members for rotation about the pivot axis and having a pair of eccentric surfaces each centered on an eccentric axis parallel to and radially offset from the pivot axis and each supporting one of the gear sections of the other of the hinge members for relative turning and for orbiting of the external gear annuli relative to and in mesh with the internal gear annuli. Advantageously, the other hinge member includes a hinge element and two spur gears which have the other pair of gear sections and which axially flank the hinge member, being so connected to the latter as to entrain the same for turning about the pivot axis, and the one hinge member includes a pair of hinge portions which axially embrace the other hinge member and each of which has one of the gear sections of the one pair of gear sections thereon. Inasmuch as the hinge portions which together form the one hinge member embrace the hinge element as well as the two spur gears of the other hinge member in a symmetrical manner, there is obtained an exact resolution of the support forces and the transmission of the same support force components into the centric portions of the eccentric which adjoin the eccentric surfaces of the eccentric to the two axial sides thereof.

It is further advantageous, in accordance with a currently preferred aspect of the present invention, when the gear sections of a selected one of the pairs of gear sections are connected to one another for relative turning about the respective one of the pivot and eccentric axes for eliminating play between the teeth of the external and internal gear annuli, and when means is provided for maintaining the selected pair of gear sections in the respective play-eliminating relative position thereof. Advantageously, the maintaining means includes a resiliently yieldable element connected to the gear sections of the selected pair and urging the same toward said relative position thereof. An especially simple construction is obtained when the resiliently yieldable element is connected to and acts on the hinge portions of the one hinge member. As a result of the connection of the two hinge portions of the one hinge member by the resiliently yieldable element, the hinge portions can be so adjusted as to their relative turned position that, for instance, one of the internal gear annuli abuts the associated one of the external gear annuli at the right-hand flank, while the other internal gear annulus engages the associated external gear annulus at the left-hand flank. However, inasmuch as both of the spur gears which have the external gear annuli are mounted on an eccentric surface of the eccentric each, there is obtained of pre-tension between the toothed zones which eliminates the radial play. It is especially advantageous when the resiliently yieldable element is an elongated body of an elastically yieldable material which has two ends, one of which is rigidly connected to one and the other to the other of said hinge portions of said one hinge member.

In order to keep the eccentric surfaces of the eccentric substantially free of support forces and to let only the adjustment forces act thereat for an easier adjustability, and especially in order not to let the displacement which results from the eccentricity act on the hinge members, the hinge element of the other hinge member is so constructed, in accordance with a further advantageous aspect of the present invention, as to have an opening which receives a portion of the eccentric situated intermediate the eccentric surfaces with freedom of movement with the above-mentioned portion of the eccentric within the opening of the hinge element, the hinge element and the hinge portions being provided with interengaging circular projections and circular grooves which center the hinge element for pivoting about the pivot axis of the eccentric.

In order to assure the transmission of relative motion between the spur gears and the internal gear annuli from one to the other of the hinge members, there is provided means for connecting the hinge element of the spur gears for entraining the hinge element for pivoting about the pivot axis and with freedom of eccentric displacement of the spur gears relative to the hinge element, the connecting means advantageously including a plurality of projections on the spur gears which are uniformly distributed on a circle centered on the eccentric axis, and a plurality of apertures in the hinge elements which are uniformly distributed on a circle centered on the pivot axis and which respectively receive the projections of the spur gears and have diameters exceeding those of the projections by twice the offset of the eccentric axis from the pivot axis.

In a further currently preferred embodiment of the present invention, the connecting means includes a plurality of projections on each axial side of the hinge element which are uniformly distributed on a circle centered on the pivot axis, and a plurality of apertures in each of the spur gears which are uniformly distributed on a circle centered on the eccentric axis and which respectively receive the projections of the hinge element and have diameters exceeding those of the projections by twice the offset of the eccentric axis from the pivot axis. Advantageously, the projections are respective free end portions of pins which are fixedly connected to the hinge element.

In accordance with one aspect of the present invention, the eccentric axis of one of the eccentric surfaces coincides with that of the other eccentric surface. However, it is also proposed by the present invention, in order to enhance the elimination of the radial play, to locate the eccentric axis of one of the eccentric surfaces diametrically opposite from, and at the same distance from the pivot axis as, the eccentric axis of the other of the eccentric surfaces. As a result of the opposite arrangement of the meshing regions of the gear annuli, on the one hand, and of the engagement regions of the projections which are received in the apertures, the manufacturing tolerances partially cancel each other out.

The novel features which are considered as characteristic for the invention taken on line I—I of FIG. 2 are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a sectional front view of a hinge arrangement of the present invention;

FIG. 2 is a partly sectioned side view of the hinge arrangement taken on line II—II of FIG. 1;

DESCRIPTION OF THE PREFERRED EMBODIMENTS

Figure 3:
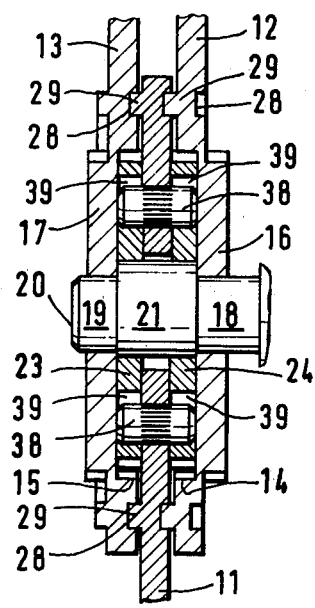
FIG. 3 is a view analogous of FIG. 1 but of a modified hinge arrangement of the present invention.

Referring now to the drawing in detail, and first to FIGS. 1 and 2 thereof, it may be seen that the hinge arrangement illustrated therein includes a tiltable hinge member 10 which is associated with the backrest component of a non-illustrated motor vehicle seat, and a stationary hinge member 11 which is connected with the seat component of the motor vehicle seat. The hinge members 10 and 11 are mounted on one another for relative turning.

The hinge member 10 includes two hinge portions or brackets 12 and 13 which are provided with advantageously pressed-out discs 16 and 17 which set free respective internal gear annuli 14 and 15 and which are respectively supported on two centric portions 18 and 19 of an eccentric 20 for turning relative thereto. An eccentric portion 21 is provided intermediate the centric portions 18 and 19 of the eccentric 20. The eccentric portion 21 of the eccentric 20 is surrounded, in its central region, by a central bore 22 of the hinge member 11 with such a play that there is obtained a possibility of a free eccentric movement of the eccentric portion 21 of the eccentric 20. On the other hand, two spur gears 23 and 24, which are arranged to the two axial sides of the hinge member 11, are supported on the eccentric portion 21 of the eccentric 20. The spur gears 23 and 24 have respective external gear annuli which respectively mesh with the internal gear annuli 14 and 15. The spur gears 23 and 24 are axially embraced by the discs 16 and 17 of the hinge brackets 12 and 13.

In the exemplary embodiment illustrated in FIGS. 1 and 2, the spur gears 23 and 24 have eight projections 25 which are uniformly distributed on a circle which is centered on the eccentric portion 21 of the eccentric. The projections 25 extend, from each axial side, in respective ones of eight apertures 26 of the hinge member 11. The apertures 26 of the hinge member 11 are also arranged at a circle the diameter of which corresponds to that of the circle along which the projections 25 are distributed, but the circle along which the apertures 26 are distributed being centered on the centric portions 18, 19 of the eccentric 20. The apertures 26 have diameters which are greater by twice the eccentricity of the eccentric portion 21 of the eccentric 20 than the diameters of the projections 25. The spur gears 23 and 24 form together a gear portion 27 which meshes with the internal gear annuli 14 and 15 of the hinge member 10.

The hinge member 11 and also each of the two hinge brackets 12 and 13 are provided, at one axial side thereof, with an annular groove 28 and, on the other axial side, an oppositely located annular projection 29.

The internal diameter of each of the annular grooves 28, as well as the inner diameter of each of the annular projections 29 are somewhat greater than the diameter of the crown circle of the internal gear annuli 14 and 15, and the annular grooves 28 and the annular projections 29 extend concentrically to the centric portions 18 and 19 of the eccentric 20. Herein, the width of each of the annular grooves 29 is so selected that the annular projection 29 can be received therein for guidance. In the illustrated exemplary embodiments of the present invention, as can be ascertained from FIGS. 1, 3 and 4, the annular projection 29 of the hinge bracket 12 engages in the annular groove 28 of the hinge member 11, while the annular projection 29 of the hinge member 11 is, in turn, received in the annular groove 28 of the hinge bracket 30. In this manner, there is rendered possible a centrically guided turning motion between the hinge member 10 and the hinge member 11. Connecting pins 30 serve the purpose of axial securing of the interengaging hinge members 10 and 11, the pins 30 extending beyond the two axial faces of the hinge member 11 and having respective enlarged end portions which overlap the exposed surfaces of the hinge brackets 12 and 13 for securing the same in the axial direction. The pins 30 can be rigidly connected, as seen especially from FIG. 1, at a center region of a bore in the hinge member 11 with the latter and with one another by resorting to butt welding procedures.

Figure 5:
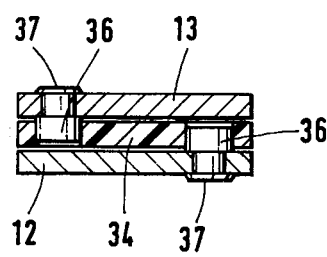
FIG. 5 is a sectional view taken on line V—V of FIG. 2.

The two hinge brackets 12 and 13 which enclose the hinge member 11 and the toothed portion 27 associated therewith, between themselves, are arranged at a distance from one another. This distance is maintained in the connecting region of the two hinge brackets 12 and 13 by welded sleeves 31 which are welded, at one of their ends, to the hinge bracket 12 and are provided, opposite to the welding locations, with respective free ends 32 each of which is received in an elongated slot 33 of the hinge bracket 13. The elongated slot 33 receives the free end portion 32 with a play in the tilting direction of several millimeters so that it is possible to relatively tilt the hinge brackets 12 and 13 to the extent of manufacturing tolerances of the gear annuli, of the eccentric, and of the bores surrounding the various portions of the eccentric, so as to eliminate the play between the cooperating parts which results from such manufacturing tolerances. The radial play which is caused by the above-mentioned tolerances can be compensated for by the action of a resiliently yieldable body 34 which is arranged between the hinge brackets 12 and 13. This resiliently yieldable body 34 is configurated, in the illustrated embodiment, as an oval body of an elastically yieldable material which is elongated and is provided, at each of its end portions, with a bore 35 in which there is received a cylindrical head 36 of a rivet 37. As can be most clearly ascertained from FIGS. 2 and 5, the elongated resiliently yieldable body 34 extends, as to its longitudinal dimension, in the tilting direction. The bore 35 provided in one end of the resiliently yieldable body 35 surrounds the head 36 of the rivet 37 which is arranged in the hinge bracket 12, while the bore provided in the other end of the resiliently yieldable body 34 surrounds the head 36 of the rivet 37 which is affixed to the hinge bracket 13. The distance between the bores 35 in the resiliently yieldable body 34 is somewhat smaller than the distance of the rivets 37 in the normal position of the hinge brackets 12 and 13 so that, when the resiliently yieldable body 34 is mounted on the heads 36 of the rivets 37, the tensioning force of the resiliently yieldable member 34 eliminates, for all intents and purposes, the radial play between the cooperating parts.

Figure 4:
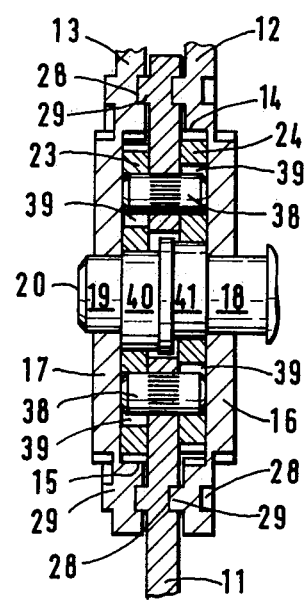
FIG. 4 is a view analogous to FIG. 1 but of yet another modification of the hinge arrangement of the present invention.

In the modifications illustrated in FIGS. 3 and 4, the spur gears 23 and 24 are not provided with the above-mentioned projections; rather the projections are formed by the free end portions of respective pins 38 which are affixed to the hinge member 11 in uniform distribution along a circle which is centered on the eccentric portions 18 and 19 of the eccentric 20. The pins 38 are, for instance, press-fitted in the hinge member 11 and the respective end portions thereof extend beyond the axial faces of the hinge member 11 to the same extent. In the exemplary embodiments illustrated in FIGS. 3 and 4, the spur gears 23 and 24 have apertures 39 which are uniformly distributed on a circle which is centered on the eccentric portion of the eccentric 20. It is to be understood that the diameters of the circles along which the pins 38 and the apertures 39 are distributed have the same diameter. It will also be appreciated that the number of the pins 38 which are uniformly distributed along the respective circle corresponds with the number of the apertures 39 which are uniformly distributed along their respective circle. The apertures 39 have diameters which are larger by twice the eccentricity than the diameters of the pins 38.

In the exemplary embodiment which is illustrated in FIG. 4, the eccentric portion includes two eccentric surfaces 40 and 41 each of which is associated with one of the spur gears 23 and 24. These eccentric surfaces 40 and 41 are offset from one another by twice the eccentricity and with respect to the centric portions 19 and 18 by the single eccentricity. As a result of this, there are obtained two mutually diametrically opposite engagement regions of the spur gear 23 with the internal gear annulus 15 associated therewith, and of the spur gear 24 with the internal gear annulus 14 associated with the latter.

A handgrip member 42 is connected, in a well-known manner, with the eccentric 20. When the handgrip member 42 is rotated, the eccentric portion 21 orbits, or the eccentric surfaces 40 and 41 orbit, about the pivot axis of the eccentric 20. Simultaneously therewith, the meshing region of the spur gears 23, 24 with the internal gear annuli 14, 15 travels about the pivot axis. Inasmuch as the hinge member 11 is rigidly connected with the seat component of the seat, the projections 25 of the spur gears 23 and 24 which, in the exemplary embodiment illustrated in FIGS. 1 and 2, are orbitingly received in the apertures 26, so act on the spur gears 23 and 24 that the latter, because of their different number of teeth with respect to the numbers of teeth of the internal gear annuli 14 and 15, cause the internal gear annuli 14 and 15 to conduct relative movement with respect to the spur gears 23 and 24. As a result of this, the hinge member 10 which is constituted by the hinge brackets 12 and 13 and in the holes of which that pass through the welded sleeves and the hinge bracket 12 the backrest component of the motor vehicle seat is mounted, tilts. The same movement conditions are encountered in the exemplary embodiments illustrated in FIGS. 3 and 4, with the exception that the apertures 39 engagingly cooperate with the pins 38 which are rigidly connected with the hinge member 11 and which form the projections.

It will be understood that each of the elements described above, or two or more together, may also find a useful application in other types of constructions differing from the types described above.

While the invention has been illustrated and described as embodied in a hinge arrangement for adjustably mounting a backrest component to a seat component of a motor vehicle seat, it is not intended to be limited to the details shown, since various modifications and structural changes may be made without departing in any way from the spirit of the present invention. So, for instance, the resiliently yieldable body 34 could be configurated as a compression spring arranged between two abutments of which one would be connected with the hinge bracket 12 and the other with the hinge bracket 13.

Without further analysis, the foregoing will so fully reveal the gist of the present invention that others can by applying current knowledge readily adpat it for various applications without omitting features, that, from the standpoint of prior art, fairly constitute essential characteristics of the generic or specific aspects of this invention.

What is claimed as new and desired to be protected by Letters Patent is set forth in the appended claims:

1. A hinge for adjustably mounting a backrest component on a seat component of a seat, particularly of a vehicle seat, comprising, in combination, two hinge members each rigidly connected to one of the components of the seat and each having a pair of gear sections, each section of one of said pairs having an internal gear annulus, and each section of the other of said pairs having an external gear annulus; and an eccentric mounted on one of said hinge members for rotation about a pivot axis and having a pair of eccentric surfaces each centered on an eccentric axis parallel to and radially offset from said pivot axis and each supporting one of said gear sections of the other hinge member for relative turning and for orbiting of said external gear annuli relative to and in mesh with said internal gear annuli; said other hinge member including a hinge element and two spur gears which have said other pair of gear sections and which axially flank said hinge element, being so connected to the latter as to entrain the same for turning about said pivot axis; and said one hinge member including a pair of hinge portions which axially embrace said other hinge member and each having one of said gear sections of said one pair of gear sections.

2. A hinge as defined in claim 1, wherein said gear sections of a selected one of said pairs of gear sections are connected to one another for relative turning about the respective one of said pivot and eccentric axes for eliminating play between the teeth of said external and internal gear annuli; and further comprising means connected to said selected pair of gear sections for maintaining the latter in the respective play-eliminating relative position thereof.

3. A hinge as defined in claim 2, wherein said maintaining means includes a resiliently yieldable element connected to said gear sections of said selected pair and urging the same toward said relative position thereof.

4. A hinge as defined in claim 3, and wherein said resiliently yieldable element is connected to and acts on said hinge portions of said one hinge member.

5. A hinge as defined in claim 4, wherein said resiliently yieldable element is an elongated body of an elastically yieldable material having two ends one of which is rigidly connected to one and the other to the other of said hinge portions of said one hinge member.

6. A hinge as defined in claim 1, wherein said hinge element of said other hinge member has an opening which receives a portion of said eccentric situated intermediate said eccentric surfaces with freedom of movement of said portion of said eccentric within said opening of said hinge element; and further comprising interengaging circular projections and circular grooves respectively provided on said hinge element and on said hinge portions and centering said hinge element for pivoting about said pivot axis of said eccentric.

7. A hinge as defined in claim 6; and further comprising means for connecting said hinge element to said spur gears for entraining said hinge element for pivoting about said pivot axis and with freedom of eccentric displacement of said spur gears relative to said hinge element, including a plurality of projections on said spur gears which are uniformly distributed on a circle centered on said eccentric axis, and a plurality of apertures in said hinge element which are uniformly distributed on a circle centered on said pivot axis and which respectively receive said projections on said spur gears and have diameters exceeding those of said projections by twice the offset of said eccentric axis from said pivot axis.

8. A hinge as defined in claim 6; and further comprising means for connecting said hinge element to said spur gears for entraining said hinge element for pivoting about said pivot axis and with freedom of eccentric displacement of said spur gears relative to said hinge element, including a plurality of projections on each axial side of said hinge element which are uniformly distributed on a circle centered on said pivot axis, and a plurality of apertures in each of said spur gears which are uniformly distributed on a circle centered on said eccentric axis and which respectively receive said projections of said hinge element and have diameters exceeding those of said projections by twice the offset of said eccentric axis from said pivot axis.

9. A hinge as defined in claim 8, wherein said projections are respective free end portions of pins fixedly connected to said hinge element.

10. A hinge as defined in claim 1, wherein said eccentric axis of one of said eccentric surfaces coincides with that of the other eccentric surface.

11. A hinge as defined in claim 1, wherein said eccentric axis of one of said eccentric surfaces is located diametrically opposite from, and at the same distance from said pivot axis as, said eccentric axis of the other of said eccentric surfaces.

* * * * *